(No Model.)
I. G. PLATT.
RIVET.
No. 420,829.  Patented Feb. 4, 1890.
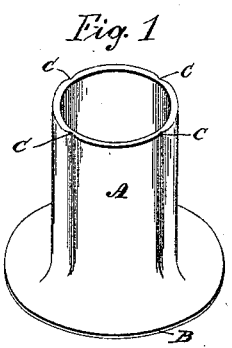
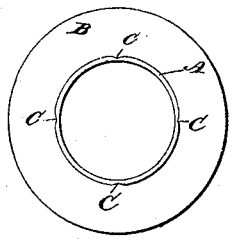
Witnesses:
Chas B. Shumway
Harry A. Hall
Inventor
Irving G. Platt.
By Geo. D. Seymour
Atty.

UNITED STATES PATENT OFFICE.

IRVING G. PLATT, OF WATERBURY, CONNECTICUT.

RIVET.

SPECIFICATION forming part of Letters Patent No. 420,829, dated February 4, 1890.

Application filed June 1, 1889. Serial No. 312,874. (No model.)

*To all whom it may concern:*

Be it known that I, IRVING G. PLATT, residing at Waterbury, in the county of New Haven and State of Connecticut, have invented certain new and useful Improvements in Weakened Rivets; and I do declare the following to be a full, clear, and exact description of the same, reference being had to the accompanying drawings, which form a part of this specification.

My invention relates to an improved rivet, the object being to weaken rivets to adapt them to break down or spread uniformly.

With this end in view my invention consists of a rivet weakened in one or more longitudinal lines and in certain details of construction, as will be hereinafter described, and pointed out in the claims.

In the accompanying drawings, Figure 1 is a perspective view of a rivet embodying my invention, and Fig. 2 is a plan view thereof.

As herein shown, my improved rivet consists of a hollow shank A and a flange or lip B formed at one end thereof, the said shank being weakened at four equidistant points upon its surface, as at C C C C, in lines extending longitudinally with it and to the extreme outer end of the shank. The shank is not cut through, but merely thinned on such lines by a removal of the metal by a broaching operation, by its displacement by rolling, or by any equivalent means.

It will be readily seen that when the end of the rivet is subjected to spreading action it will split at its outer edge and break into four equal sections, which will readily roll back and fold down, whereby, a neater and more effective clamp is secured than can be had with the ordinary rivet, which tears and spreads sometimes one way and sometimes the other, but never uniformly. If desired, the metal may be thinned from the inside of the rivet.

I would have it understood, also, that my invention is not limited in use to the type of rivet herein shown.

Having fully described my invention, what I claim as new, and desire to secure by Letters Patent, is—

1. As a new article of manufacture, a rivet having a shank open at its smaller end and weakened in one or more longitudinal lines by reducing the metal in thickness along such lines, whereby said shank is adapted to be spread into sections and folded back to clinch the rivet.

2. As a new article of manufacture, a rivet having its shank weakened by reducing the metal in thickness along one or more longitudinal lines extending to the extreme outer end of the shank, substantially as set forth.

3. As a new article of manufacture, a hollow rivet consisting of a hollow shank having a lip or flange at one end and open at the other end, and having one or more grooves extending longitudinally part way through the metal forming the shank to weaken it, substantially as set forth.

In testimony whereof I hereby sign this specification in the presence of two subscribing witnesses.

IRVING G. PLATT.

Witnesses:
CHAS. B. SHUMWAY,
HARRY A. HALL.